N. B. GARDINER.
FLUID MEASURING APPARATUS.
APPLICATION FILED MAY 31, 1917.
1,429,232.
Patented Sept. 19, 1922.
5 SHEETS—SHEET 5.
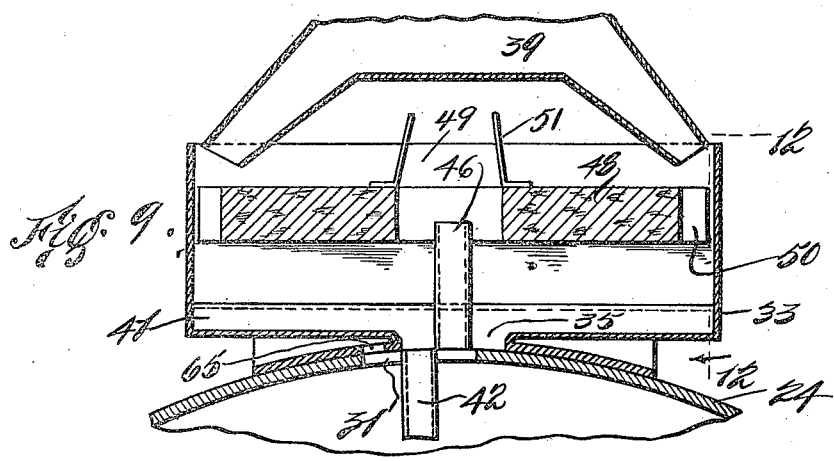
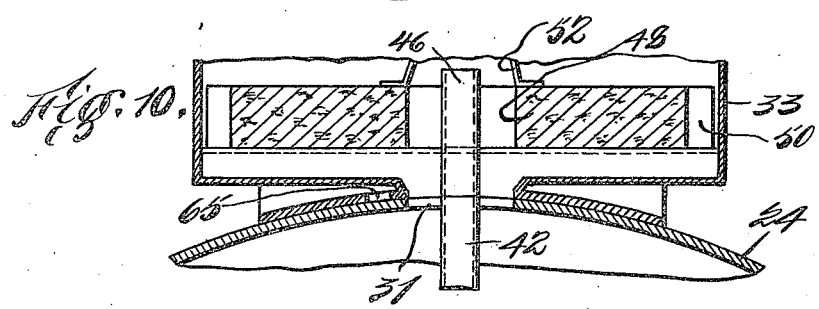
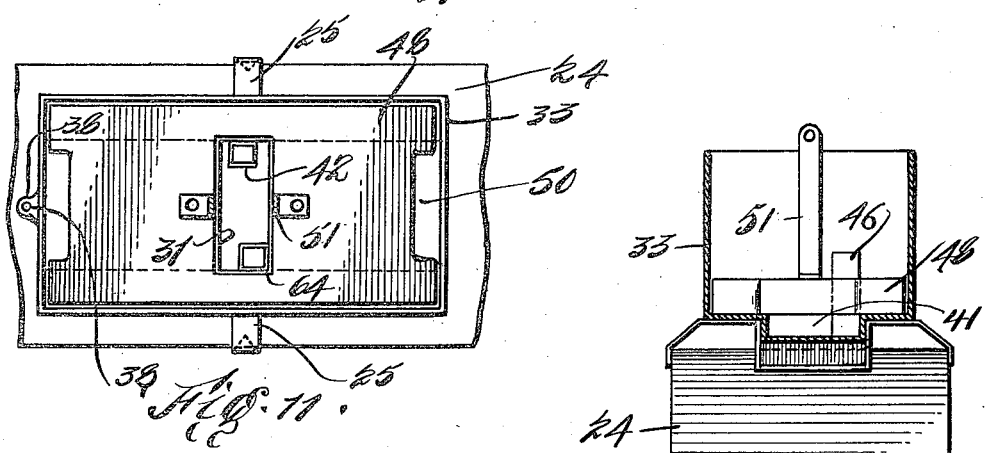
Inventor
Norman B. Gardiner
By his Attorneys Patented Sept. 19, 1922.

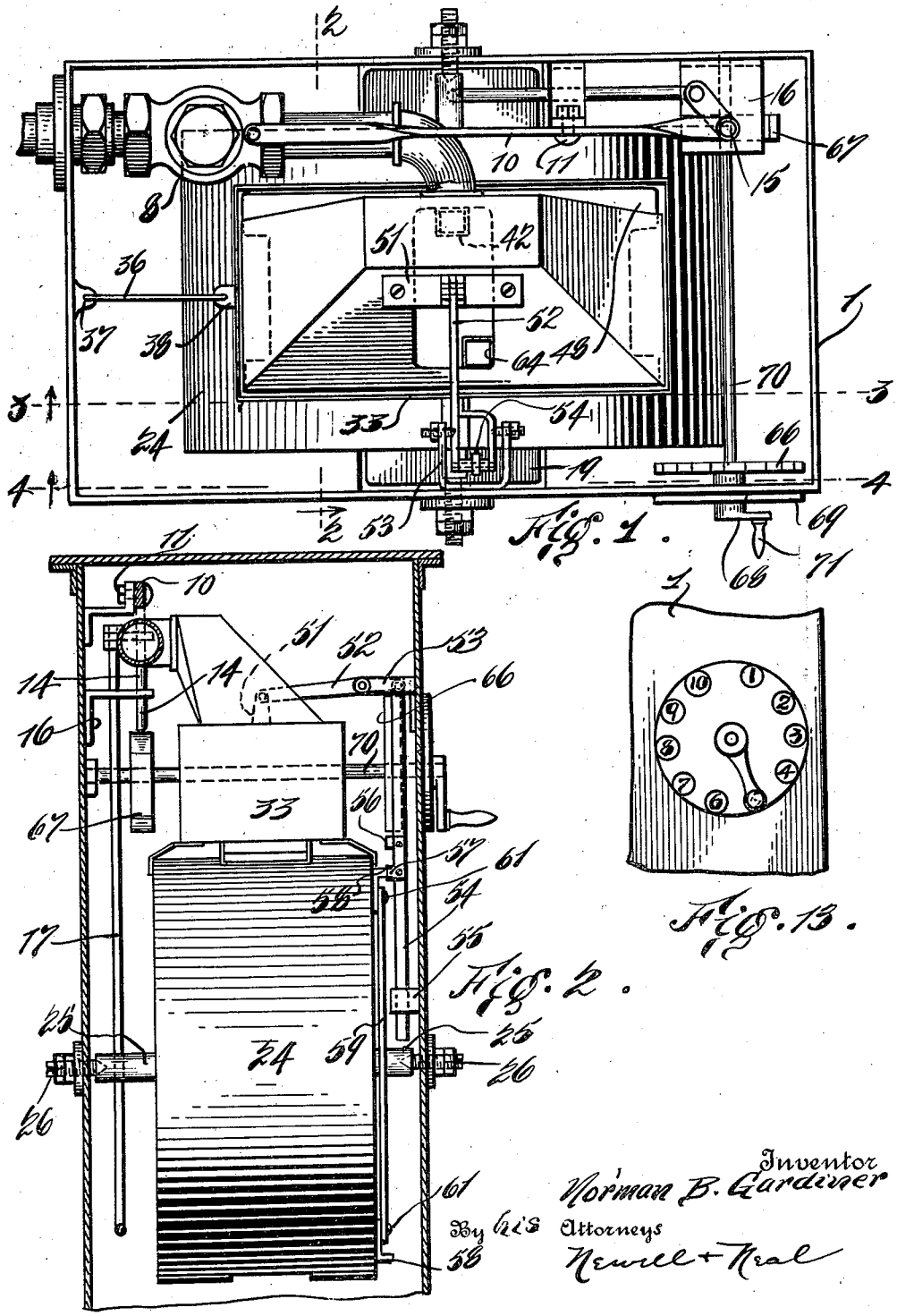

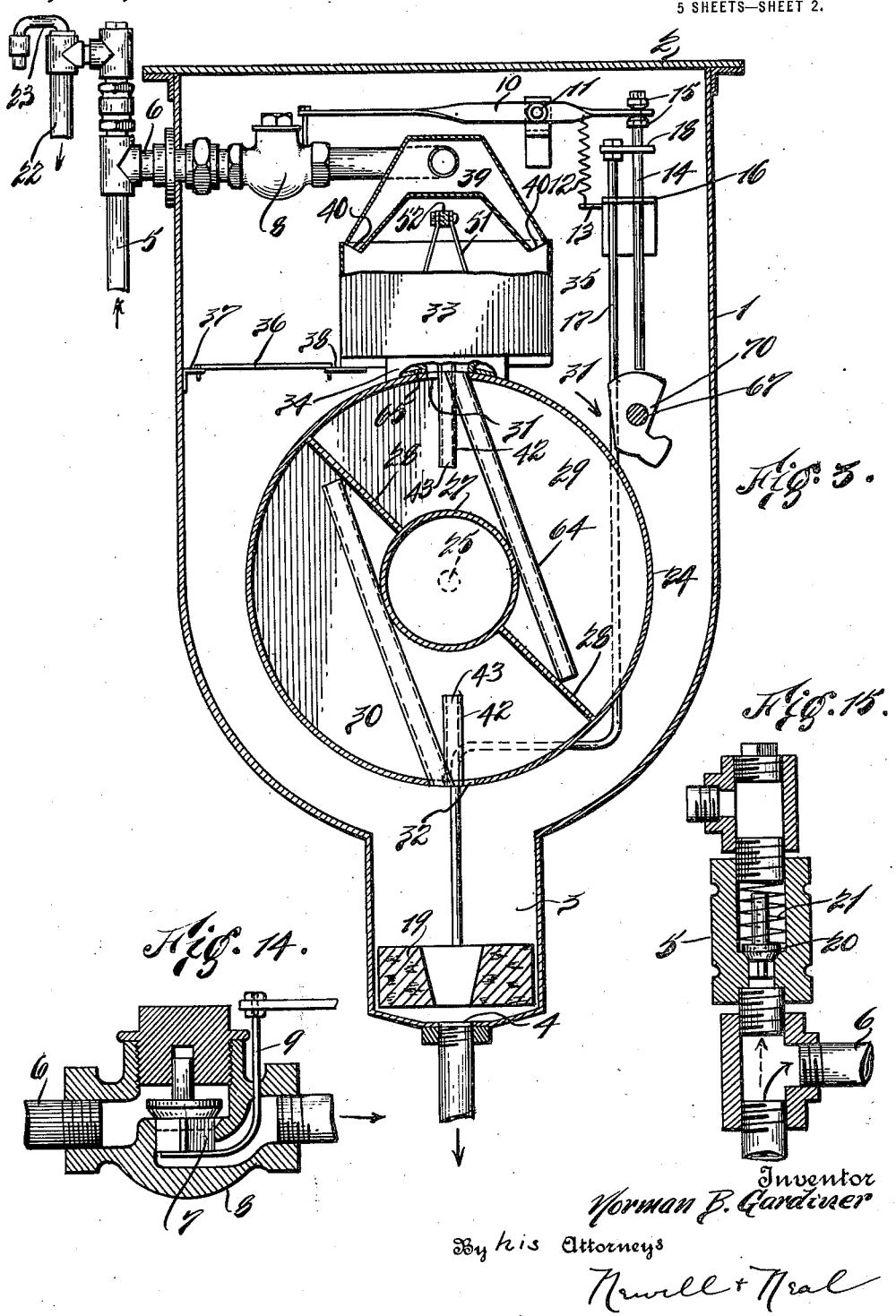

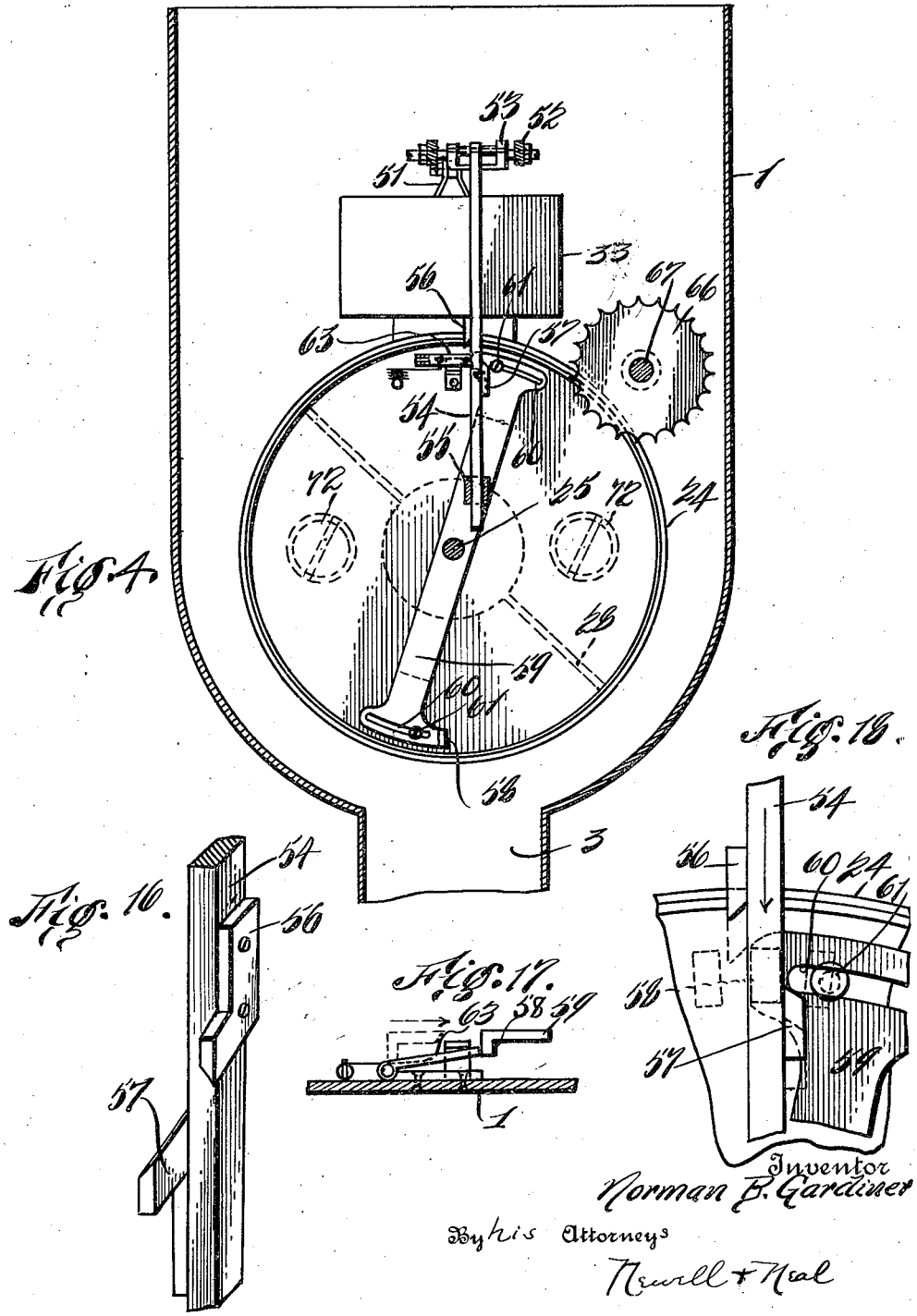

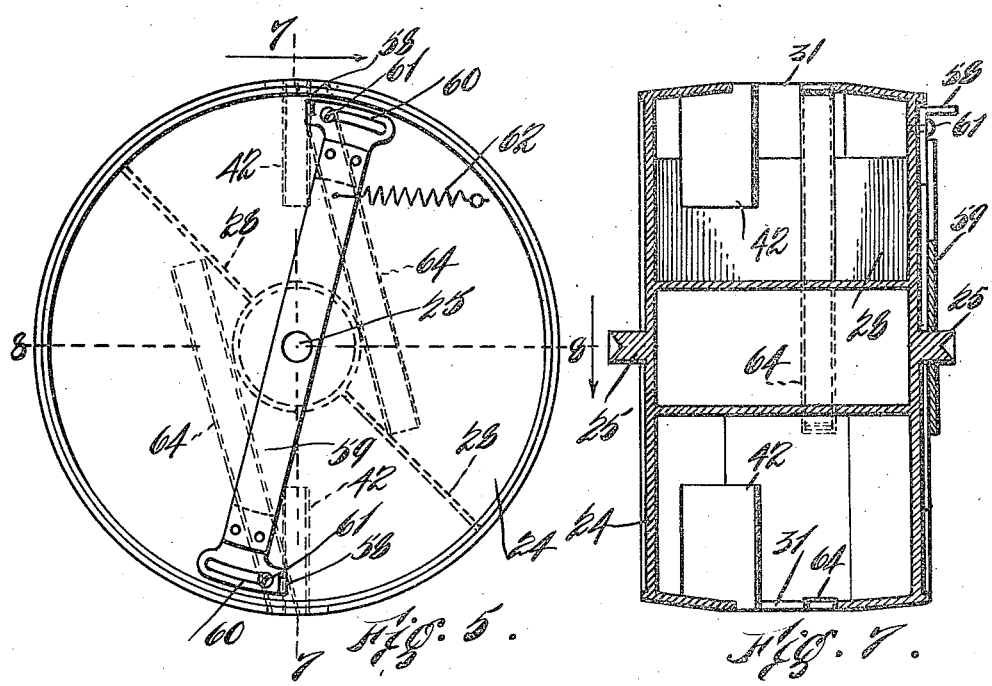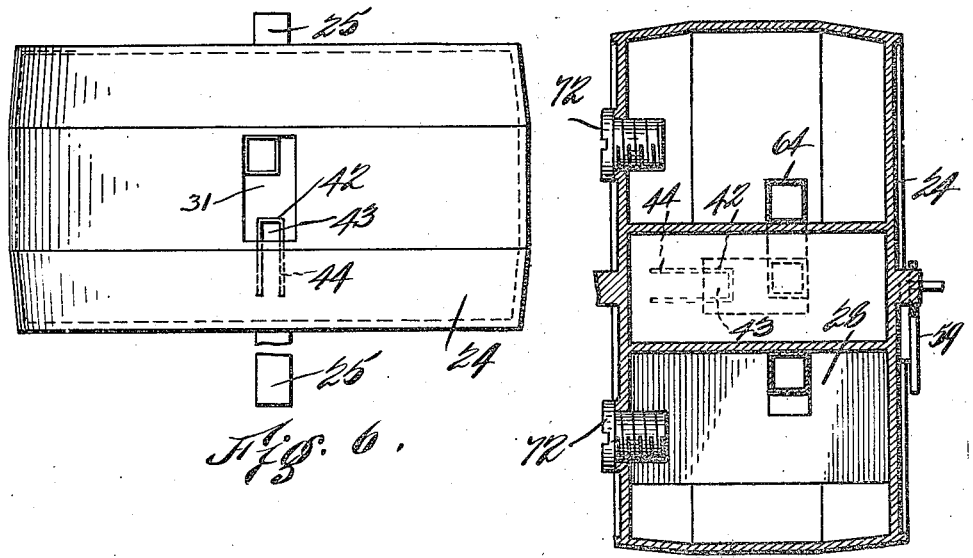

1,429,232

UNITED STATES PATENT OFFICE.

NORMAN B. GARDINER, OF STATEN ISLAND, NEW YORK.

FLUID-MEASURING APPARATUS.

Application filed May 31, 1917. Serial No. 171,825.

*To all whom it may concern:*

Be it known that I, NORMAN B. GARDINER, a citizen of the United States, residing at Staten Island, borough of Richmond, county and State of New York, have invented certain new and useful Improvements in Fluid-Measuring Apparatus, of which the following is a clear, full and exact description.

This invention relates to an improvement in apparatus for measuring fluids, and is more particularly adapted for use in connection with pumps or any other source of supply for dispensing gasoline and the like. In devices of this character it is desirable to deliver the gasoline quickly, conveniently and in accurate volumetric quantities, and the object of the present invention therefore is to improve the volumetric efficiency of such an apparatus, and furthermore to give the consumer what is known as a "struck measure" with no chance for inaccuracies due to failure of pumping mechanism to operate properly.

The present apparatus is arranged to be adjusted for delivering predetermined quantities of fluid as may be desired, and a further object of the invention is to render such an apparatus fool-proof against careless handling on the part of the operator so that when once adjusted to deliver a stated quantity of fluid, it will deliver that quantity no more and no less whether the operator keeps on pumping or keeps the supply valves open or not.

A counter is arranged in connection with the apparatus to indicate not how many times the operator turns over a pump handle as in former devices, but the number of times that a full struck measure of fluid is delivered to the consumer, and furthermore should for any reason the discharge of fluid from the apparatus be impeded, the supply of fluid to the apparatus is returned to its source and the counter no longer operates.

In the preferred embodiment of my invention, I employ a measuring container having one or more measuring compartments for receiving fluid from the supply and preferably gravity operated to move from its receiving to its discharging position. A distinguishing feature of this invention over other apparatuses of this kind is that the fluid supplied to the container or compartment thereof at each receiving operation is limited to the exact volumetric capacity of the container or its compartment. Any surplus fluid supplied to the container, instead of being allowed to drip over into the discharge outlet and thereby make the delivery of the apparatus uncertain, is taken care of in an overflow chamber so as to be ready for delivery to the container upon the next succeeding receiving operation. Furthermore, the operation of the container is preferably controlled by the overflow in said overflow chamber so as to insure the filling of said container at least up to its volumetric capacity.

A further object is to insure rapid and complete filling and emptying of the container by facilitating the passage into and out of the container of the air that is displaced by, or displaces, liquid being measured and in preventing air from being carried into the container with the inflowing liquid. In this way the formation of air pockets in the container is avoided, which would result in inaccurate measuring of the liquid. The unimpeded flow of liquid rapidly into and out of the container will be indicated by the almost entire absence of air bubbling and gurgling, which is the usual accompaniment of the interfering flow of water and air during the displacement of one for the other within a container through the same opening.

By an apparatus of this kind, the amount of fluid delivered is made absolutely accurate at all times and will not vary with the skillful manipulation of a pump handle, as is the case in many self-measuring pumps today, nor will the delivered quantity vary with the change in the rate of supply, as is the case with the ordinary type of measuring wheel.

The advantage of giving the consumer a "struck measure" is that he is certain of its accuracy, and with an apparatus of this kind the operation of the measuring container can advantageously be exposed through a glass window in the side of the casing, whereby the consumer can at all times see exactly what he is getting. Further objects and advantages of the invention will become apparent from the following description and the accompanying drawings.

In the preferred embodiment of the invention shown in the drawings,

Fig. 1 is a plan view of the apparatus with the cover removed;

Fig. 2 is a transverse section taken

Fig. 3 is a transverse section taken on line 3—3 of Fig. 1;

Fig. 4 is a view taken on line 4—4 of Fig. 1;

Figs. 5 and 6 are elevation and plan views respectively of the measuring container;

Figs. 7 and 8 are transverse sectional views taken on line 7—7 and 8—8 of Fig. 5;

Figs. 9 and 10 are vertical sectional views through the adjacent portions of the measuring container and the supply and overflow chamber;

Fig. 11 shows a plan of the intermediate supply chamber;

Fig. 12 is a part elevational and part sectional view of the structure shown in Fig. 11;

Fig. 13 is a detail of the indicator and dial;

Fig. 14 is a vertical section of the valve in the supply pipe;

Fig. 15 is a view in section of the upper end of the supply pipe showing the by-pass arrangement;

Figs. 16, 17 and 18 are details of the holding means for the measuring container.

In the drawings, 1 indicates an outside casing provided with a cover 2 at its upper end and a delivery passage 3 and an outlet 4 at its lower end. 5 indicates a vertical supply pipe which may be connected to any ordinary source of supply, such as a hand-operated pump or gravity tank. The horizontal pipe 6 opens from one side of the vertical pipe 5 and extends to the interior of the casing. In this pipe is provided a poppet valve 7 vertically movable in the valve chamber 8; to lift this valve from its seat there is provided a lifter 9 passing through the upper wall of the valve chamber and connected to one end of a lever 10 pivoted at 11. A spring 12 secured to the lever 10 and to a bracket 13 on the wall of the casing, normally tends to pull up the end of the lever to which the lifter 9 is attached, and therefore to hold the valve 7 off its seat. A rod 14 depends from the other end of the lever, being secured thereto by means of adjustable nuts 15, and passes through an opening in the flange 16 on the bracket 13. A second rod 17 also extends through the flange 16. An arm 18 is rigidly connected at one end with the upper end of the rod 17, and slidably connected at its other end with the rod 14. The lower end of the rod 17 is secured to the float 19 in the delivery passageway 3. It will be observed that by this construction the upward movement of the float 19 will elevate the rod 17, bringing the arm 18 in contact with the lower nut on rod 14, thereby raising the adjacent end of lever 10 and depressing the opposite end on which the lifter 9 is carried, thereby permitting the poppet valve 7 to drop onto its seat and prevent the further passage of fluid through the pipe 6. This action takes place whenever the fluid delivery through the outlet 4 becomes impeded through any obstruction and thereby tends to back up into passageway 3, causing float 19 to rise. When the valve 7 is closed, the liquid being forced through the supply pipe 5 attains sufficient pressure to raise the by-pass valve 20 from its seat against the force of its spring 21 to thereby permit the liquid to pass into the by-pass return pipe 22 back to the source of supply. The by-pass pipe 22 is provided with an air inlet tube 23 in order to prevent the creation of a vacuum in the return pipe and thereby permit the valve 20 to open before the poppet valve 7 is closed.

The cylindrical measuring container 24 is rotatably mounted in the casing by means of its shaft 25 and the adjustable bearing screws 26 in each side of the casing. By means of a partition comprising a cylindrical portion 27 and radial portions 28, the interior of the container is divided into a plurality of measuring compartments, in the present case two in number, designated respectively by the reference characters 29 and 30. The compartments are provided with inlet openings in the form of slots 31 and 32 respectively, and it is understood that said inlet openings act alternately to receive and discharge contents of the compartments during the rotation of the container.

Above the measuring container 24 and resting thereon is an intermediate supply receptacle 33 which also serves as an overflow chamber, and the bottom of said supply receptacle is preferably provided with a bottom block 34 closely fitting at its lower surface upon the peripheral curved surface of the container 24. The block 34 has a slot or opening 35 therein adapted to register with either one of the slots 31 and 32 of the compartments in the container. The container is designed to rotate in the direction shown by the arrow in Fig. 3; but the supply receptacle is prevented from movement with the container by means of the link 36 secured to the bracket 37 on the wall of the casing and to the projection 38 on the receptacle 33. The horizontal pipe 6 is provided with a double spout 39 which, by means of its two discharge openings 40, empties into the receptacle 33 adjacent the end walls thereof. The bottom wall of the receptacle 33 is provided with a longitudinal channel 41 Figs. 9 and 12 which receives the fluid and conducts it to the opposite sides of the discharge opening 35. Each of the openings 31 and 32 in the measuring container has a portion thereof set off by means of a partition 42 to provide an air outlet 43. This partition comprises a channel shaped member Figs. 6 and 7 extending inwardly from the opening at one end thereof, the flanges 44 of the channel extending underneath the peripheral wall of the container with the opening of the channel facing away from the main portion of the opening. The receptacle 33 is provided with an air passage in the form of a vertical pipe 46. When one of the inlet openings 31 or 32 is in full registration with the discharge opening 35 in the bottom of the supply receptacle, the lower end of the pipe 46 registers with the upper end of the air outlet 43 as shown in Fig. 10.

When the parts are in this position the gasoline or other fluid discharged through the spout 39 enters channel 41 and flows horizontally along said channel and over the opposite sides of the opening 35 into the compartment of the measuring container. The air displaced by the inflowing gasoline passes out through the air outlet 43 and the air pipe 46, thus obviating the gurgling and splashing that ordinarily results, as when the gasoline is poured directly into the same opening as that through which the air must escape. By having the partition 42 arranged as set forth, this partition acts as a baffle between the inflowing gasoline and the outflowing air and practically none of the air is caught by the incoming stream of gasoline. By having the spout 40 arranged as shown, the gasoline is not only prevented from being discharged into the upper end of the air pipe 46 but, moreover, is caused to flow into the inlet opening horizontally from the sides thereof, and the entrainment of air such as would be consequent upon the vertical descent of gasoline directly from the spout to the measuring compartment, is avoided.

When a compartment in receiving position has become filled to capacity, the fluid backs up through its inlet into the receptacle 33, which thus acts as an overflow chamber, and this backed up fluid in the overflow chamber acts to release the holding means for the container so as to allow said compartment to be moved to discharging position by the weight of the fluid in the compartment; it being understood that as the compartment is filled with fluid it tends to rotate the container to bring said compartment into discharging position and the other compartment into receiving position, since as is apparent from an inspection of Fig. 3, the center of gravity of the compartment when the inlet opening is in receiving position is in advance of the vertical plane containing the axis of rotation of the container, and, on account of the peculiar shape of the compartment, is at a considerable distance from said axis of rotation, whereby a substantial turning moment is obtained.

Within the receptacle or overflow chamber 33 is a float 48 loosely fitting the receptacle and having a central slot 49 registering with the slot 35 in the bottom of the receptacle, and having its ends recessed as at 50 to permit unobstructed flow of the gasoline or other fluid from the spout 39. The float 48 is connected by brackets 51 to one end of a lever 52 pivoted upon a bracket 53 fixed to the casing 1 (see Fig. 2). The other end of the lever 52 is connected to a vertically sliding holding bar 54 movable in a guide 55 on the casing 1. The holding bar has upper and lower holding lugs 56 and 57 adapted to stand in the path of a stop lug 58 on the adjacent side of the container 1. There are two of these stop lugs 58, one corresponding to each compartment, and they are carried on the opposite ends of a stop lug bar 59 rotatably mounted on the shaft 25 of the container. The ends of the bar 59 have arcuate slots 60 therein, in which are received pins 61 fixed to the side wall of the container. A spring 62 secured to the bar 59 and to the container tends to hold the bar with the ends of the slots adjacent the stop lugs 58 bearing on the pins 61. A spring-pressed latch 63 is mounted upon the casing 1 for acting as a retaining means against the uppermost stop lug as shown in Figs. 4 and 17.

Assuming the parts to be in the position shown in Fig. 3 and that fluid is being delivered to the container through the pipes 5 and 6, the following operation will take place. As the fluid fills up the compartment 29 and backs up into the receptacle 33, the float 48 is raised and through the lever 52 depresses the holding bar 54. Holding lug 57 of said holding bar is thereby moved downwardly from solid to dotted line position shown in Fig. 18 to release the stop lug 58 upon the container, whereby the container will be rotated to bring compartment 29 to discharging position and compartment 30 to receiving position. It will be observed that as the compartment 29 moves to its discharging position, the inlet 31 thereof is cut off by the overlapping surface of the block 34. Furthermore it will be observed that the overlapping cut-off surface of block 34 is wider than the inlet 31 so as to completely cut off the same before any discharge or spilling over can take place from the filled compartment 29. This action of the block 34 in cutting off the inlet 29 gives a "struck measure" and it insures that the amount of fluid supply to said compartment is limited to exact volumetric capacity. As the compartment 29 swings around to discharging position, its momentum carries it far enough to bring stop lug 58 in front of latch 63 to thereby hold it in a discharging position. Movement of the compartment 29 is limited by the stop lug 58 coming against the holding lug 56 of bar 54, which is still in its lowered position as shown in dotted lines in Fig. 18, due to the fact that the float 48 is still raised by the overflow in the receptacle 33.

As soon, however, as compartment 30 brings its inlet 32 in position to receive the fluid from the overflow chamber, the float 48 descends and the bar 54 rises to bring holding lug 57 into position in front of the stop lug 58 and thereby hold the compartment 30 in its receiving position until filled for repeating the operation.

Within each compartment is an air inlet tube 64; the outer end of this tube opens through the slot 31 or 32 of its compartment and the tube extends inwardly approximately to the opposite corner of the compartment, so that when the compartment is in discharging position the inner end of the tube is substantially at the highest point of the compartment. The walls of the tube therefore divide the compartment into two sections, opening outwardly through the wall of the container and opening into each other at a point within the container, that is at the inner end of the tube. When the compartment is in discharging position, the tube provides a means whereby air may pass into the compartment behind the fluid therein without interfering with the outflowing stream of fluid. Of course before the compartment commences to move towards discharging position, the tube 64 is filled with fluid the same as the rest of the compartment, but owing to the fact that the opening at the outer end of the tube is much greater in proportion to the volume of the tube than is the case with the rest of the compartment, the fluid in the tube will be quickly removed therefrom, partly by direct discharge through the outer end of the tube and partly by a siphoning action tending to draw the contents of the tube into the main portion of the compartment, this siphoning action being due to the lack of hydrostatic balance resulting from the more rapid initial discharge from the tube.

When in filling position, the liquid passes in at the sides of the opening 31 and the air, within the chamber being filled, is permitted to escape through the vent 43. Thus, in filling position, the vent 43 lets the air out, while in discharging position the vent 64 lets the air in, the two vents acting alternately in this respect.

As shown in Figs. 3, 9 and 10, the block 34 is hollow and on the side and the lower wall thereof is provided with openings 65. These openings are at the side of the slot 35 which the inlet opening 31 or 32 of the compartments first approaches on a return from discharging position to receiving position, and are so arranged that when the container is stopped in its rotation by the contact of a stop lug 58 with holding lug 56, the openings 65 are in registration with the slot 31 or 32 as the case may be. This is shown in Fig. 9, from which figure it will be seen that in this position the air pipe 46 is completely out of alignment with the air outlet 43 and must remain so until the holding lug 56 is withdrawn by the dropping of the float 48. The outlet 43 is therefore ineffective as a means for facilitating the discharge of air from the container. Its function is, however, performed by the openings 65 which put the interior of the compartment in communication with the atmosphere through the hollow block 34. The overflow fluid in the receptacle 33 therefore discharges rapidly into the compartment without interfering with the outpassing displaced air. The float drops quickly and the container is permitted to rotate to the position shown in Fig. 10, with the fluid inlet opening of the compartment in full registration with the discharge opening in the bottom of the receptacle, and the air outlet 43 registering with the air pipe 46. It is therefore seen that the travel of the compartment through one complete revolution involves a step-by-step movement consisting of three stages, and the first stage may be considered that represented in Fig. 3, with the compartment 29 in filling position, and the compartment 30 in discharging position. As the compartment 29 fills the container is released and rotated as already described, the compartment 30 moving to position such that the opening 32 registers with the opening 65, this being the second stage of operation. The third stage comprises a movement of the container such as will position the opening 32 in register with the fluid inlet opening, and the air outlet 43 in register with the pipe 46. In each of said stages the passage of the fluid to be measured into or out of the compartment is facilitated by providing a special air passage connecting the interior of the compartment with the exterior atmosphere. This not only assures that the compartment will be completely filled with the liquid to be measured and completely emptied thereof, but also increases the rapidity of movement of the rotating measuring container. The shock and jar to the structure that might otherwise result from this increased rapidity of operation is avoided by means of the spring 62, which permits the container to overflow slightly when the stop lugs 58 strike the holding lug 56 or 57.

In order to indicate the number of receiving and discharging cycles for each compartment, I have provided counting means which provide a star wheel 66 fixed to a shaft 67, the outer end of which has an indicator pointer 68 working in front of a dial 69 placed upon the outside of the casing, as shown in Fig. 3. The star wheel 66 is adapted to be engaged and operated by the lugs 58, so that each movement of one of said lugs past the star wheel turns said star wheel the space between two teeth. Fixed to the shaft 67 is a cam 70 (see Fig. 3) adapted to engage the lower end of the rod 14. A finger knob 71 upon the pointer 68 enables the shaft 67 to be turned for adjusting said cam 70 in any desired position to operate rod 14, depending upon the number of measured quantities which it is desired to deliver through the apparatus. The dial 69 will indicate the number of quantities to be delivered, and it is understood that when the cam 70 is carried around to lift the rod 14, the lever 10 is moved about its pivot to lower the lifter 9 and permit the valve 7 to drop to closed position, thereby stopping the supply to the container and returning it to its source through the return pipe 20. In this way the operator can adjust the apparatus to deliver any predetermined quantity of fluid and then either turn on the supply valves (not shown) for the inlet pipe 5, or else begin operating a supply pump (not shown) for said pipe 5, and the device will automatically stop delivering fluid when the predetermined quantity has been delivered. Even if the operator should continue pumping from the supply, no further fluid will be delivered through the apparatus.

In the side wall of each of the compartments 29 and 30 is fitted a screw threaded plug 72; by moving its plug inwardly or outwardly the net capacity of each compartment may be accurately adjusted.

It is apparent that many other various modifications and changes in detail may be made in the invention as shown, without departing from the spirit thereof, and I wish my claims to be interpreted broadly so as to cover all such equivalent forms.

What I claim as new is:

1. In a fluid measuring apparatus, in combination, a measuring container adapted to be completely filled with the liquid to be measured, an opening on one wall thereof whereby said container may be filled, a partition extending from a position flush with the opening to a position within said container, and dividing said opening into a fluid inlet portion and an air outlet portion.

2. In a fluid measuring apparatus, in combination, a measuring container adapted to be completely filled with the liquid to be measured, an opening in one wall thereof through which said container is filled, a partition extending from a position flush with the opening to a position within said container, and dividing said container into a fluid inlet portion and an air outlet portion, said partition being channel-shaped, the sides of said channel extending under the wall of said container away from the fluid inlet opening, whereby air in the container will be allowed to escape from said opening to allow complete filling of the container with the liquid to be measured.

3. In a fluid measuring apparatus in combination, a measuring container having an inlet for receiving fluid and an air vent, a supply receptacle having a discharge opening and an air escape passage, and means for holding said container and receptacle in position with the fluid inlet and air vent in registration with the discharge opening and air escape passage respectively.

4. In a fluid measuring apparatus in combination, a measuring container having an inlet for receiving fluid and an air vent, a supply receptacle having a discharge opening and an air escape passage, means for holding said container and receptacle in position with the fluid inlet and air vent in registration with the discharge opening and the inner end of said air escape passage respectively, and means for supplying fluid to be measured to the receptacle at a portion to one side of the outer end of said air escape passage.

5. In a fluid measuring apparatus in combination, a measuring container mounted to rotate on a horizontal axis and having an opening in its peripheral wall, a partition dividing said opening into a fluid inlet and an air vent, a supply receptacle resting on the peripheral wall of said container and held against movement therewith, said receptacle having a discharge opening in the bottom wall thereof and an air escape pipe opening through said bottom wall, means for holding said container and receptacle in position with said fluid inlet and air vent in registration with said discharge opening and pipe respectively, and means for supplying fluid to be measured to the receptacle at a point to one side of said pipe.

6. In a fluid measuring apparatus in combination, a measuring container having an inlet opening, a supply receptacle having a discharge opening adapted to register with said inlet opening, said measuring container and said supply receptacle being relatively movable to bring said openings into and out of registration, air venting means carried by said container and said receptacle respectively and arranged to be brought into registration when said inlet and discharge openings are in full registration, additional air venting means comprising a passage in said receptacle arranged to be put into communication with said inlet opening while the inlet and discharge openings are being brought into registration.

7. In a fluid measuring apparatus in combination, a measuring container having an inlet opening, a supply receptacle having a discharge opening adapted to register with said inlet opening, said measuring container and said supply receptacle being relatively movable to bring said openings into and out of registration, the flow to said measuring container being cut off when the openings are completely out of registration, means operated by the rise and fall of fluid in said receptacle for controlling the relative movement of said container and receptacle, and air venting means for said container comprising a passage in said receptacle arranged to be put into communication with said inlet opening while the inlet and discharge openings are being brought into registration.

8. In a fluid measuring apparatus in combination, a cylindrical measuring container mounted to rotate upon its axis in a vertical plane, said container having a transverse opening in its peripheral wall, a supply receptacle resting on the peripheral wall of the container and held against movement therewith, said receptacle having a discharge opening in its lower wall arranged to register with the opening in the container, a float in the receptacle, means controlled by said float and so arranged that when said float rises the container is released to rotate to discharge position and is checked on its return movement with the openings in said container and receptacle in partial registration with the bottom wall of said receptacle partially overlapping the opening in the container and that when said float is subsequently lowered said openings are brought into full registration, said receptacle having an air vent opening through the bottom wall thereof, the inner end of said air vent being in alinement with said opening in said container when said opening is in partial alinement with the discharge opening in the receptacle as above set forth.

9. In a fluid measuring apparatus in combination, a measuring container having an opening on one wall thereof, said container movable to bring said opening alternately into receiving position and discharging position, a supply receptacle having a discharge opening in its bottom wall, and means for supplying the fluid to be measured to said supply receptacle, said receptacle mounted above said container with said discharge opening alined with the path of movement of the opening in the container, the bottom wall of said receptacle and the adjacent wall of the measuring container being so arranged that the movement of the container towards discharge position cuts off the flow through said discharge opening, whereby fluid accumulates in said receptacle, said lower wall of the receptacle being provided with an air passage having its inner end opening into the return path of the opening in the container in advance of the discharge opening of the receptacle.

10. In a fluid measuring apparatus, a measuring container comprising a measuring compartment, said measuring container moving from fluid filling position to fluid discharging position, a fluid inlet and discharge opening in said container, and an air vent leading to said opening from a point within said container, said vent acting to let air out when said container is in filling position and to let air in when said container is in discharging position.

11. In a fluid measuring apparatus, in combination, a measuring container adapted to be completely filled with the liquid to be measured, an opening in one wall thereof through which the fluid flows into said container and from which it is discharged from said container, a partition extending from a position flush with the opening to a position within said container, and dividing said opening into a fluid inlet portion and an air outlet portion, and air venting means also extending from said opening from a point flush with said opening to a position within said container, said air venting means acting to let air into said container when said container is in discharging position.

12. In a fluid measuring apparatus, a measuring container comprising an otherwise closed compartment having an opening in its upper wall, a source of fluid supply, an air vent extending through said opening and acting to permit escape of air from said container during the filling operation thereof, and means for conducting fluid from said source of supply in a substantially horizontal stream to said opening at either side of said air vent.

13. In a fluid measuring apparatus, a measuring container comprising an otherwise closed compartment having an opening in its upper wall, a source of fluid supply, air venting means extending through said opening to permit escape of air from said container during the filling operation, and means for conducting fluid from said source of supply in a substantially horizontal stream to either side of said air venting means, said fluid conducting means comprising an intermediate supply receptacle having a discharge opening in its bottom wall in registration with said first-mentioned opening, and a spout connected with said source of supply and arranged to discharge into said receptacle at two points on either side of said air venting means.

14. In a fluid measuring apparatus, a measuring container comprising an otherwise closed compartment having an opening in its upper wall, a source of fluid supply, air venting means extending into said opening for permitting the escape of air from said container during the filling operation, and means for conducting fluid from said source of supply in a substantially horizontal stream entering said opening at either side of said air venting means, said fluid conducting means comprising an intermediate supply receptacle having a discharge opening in its bottom wall for registration with said first-named opening and also having a channel in its bottom wall opening into said discharge opening, and a spout connected to said source of supply and arranged to discharge into said channel at points on either side of said discharge opening.

15. In a fluid measuring apparatus, in combination, a measuring container having an inlet opening, an intermediate supply receptacle resting on said container and having a central discharge opening adapted to register with the inlet opening of the container, said receptacle having a channel in the bottom thereof communicating with said discharge opening, a float loosely fitting in said receptacle and overlying said channel, said float having portions of its ends adjacent said channel cut away, and a supply pipe extending over said receptacle and having discharge openings above each of said cut away portions of said float.

16. In a fluid measuring apparatus, in combination, a measuring container having an inlet opening, an intermediate supply receptacle resting on said container and having a central discharge opening adapted to register with the inlet opening of the container, an air vent pipe extending upwardly from one side of said discharge opening, said receptacle having a channel in the bottom thereof communicating with said discharge opening, a float loosely fitting in said receptacle and overlying said channel, said float having portions of its ends adjacent said channel cut away and having a central opening in alinement with the discharge opening of the receptacle, and a supply pipe extending over said receptacle and having discharge openings above each of said cut away portions of said float.

17. In a fluid measuring apparatus, in combination, a measuring container, a support on which said container is rotatably mounted, means for holding said container against movement while in filling position, said means operating when said container is filled with the fluid to be measured to permit movement of said container under the action of gravity to discharging position, means for checking the movement of said container on reaching discharging position, comprising cooperating stops mounted on said container and on said support, counting mechanism, and means operated by the stops carried by said container for operating said counting mechanism as said container moves to discharging position.

18. In a fluid measuring apparatus, in combination, a measuring container, a support on which said container is rotatably mounted, means for holding said container in fluid filling position comprising co-operating stops mounted on the container and on the support, automatic means releasing said container on its becoming filled with the fluid to be measured whereby it moves to fluid discharging position, a counting mechanism and means operated by the stops carried by said container for operating said counting mechanism as said container moves to discharging position.

Signed at New York, N. Y., this 29" day of May, 1917.

NORMAN B. GARDINER.